US00RE40654E

(19) United States
(12) Reissued Patent
Hannah

(10) Patent Number: US RE40,654 E
(45) Date of Reissued Patent: *Mar. 10, 2009

(54) CAMERA HAVING ADAPTIVE GAIN CONTROL

(75) Inventor: Eric C. Hannah, Pebble Beach, CA (US)

(73) Assignee: Intel Corporation, Santa Clara, CA (US)

( * ) Notice: This patent is subject to a terminal disclaimer.

(21) Appl. No.: 09/491,672

(22) Filed: Jan. 26, 2000

Related U.S. Patent Documents

Reissue of:
(64) Patent No.: 5,712,682
Issued: Jan. 27, 1998
Appl. No.: 08/770,386
Filed: Dec. 2, 1996

U.S. Applications:
(63) Continuation of application No. 08/638,528, filed on Apr. 26, 1996, now Pat. No. 5,614,948.

(51) Int. Cl.
*H04N 5/20* (2006.01)

(52) U.S. Cl. ..... 348/255; 348/222.1

(58) Field of Classification Search ..... 348/222, 348/255, 256, 707, 678, 689, 690, 229, 230, 348/223, 228, 224, 229.1, 222.1, 230.1, 223.1, 348/228.1, 224.1; *H04N 5/228, 5/20, 9/64*
See application file for complete search history.

(56) References Cited

U.S. PATENT DOCUMENTS 4,962,426 A * 10/1990 Naoi ..... 348/623
5,157,493 A * 10/1992 Hamon ..... 348/682
5,282,022 A * 1/1994 Haruki et al. ..... 348/223
5,295,001 A * 3/1994 Takahashi ..... 348/230
5,400,074 A * 3/1995 Shimizu ..... 348/255
5,402,249 A * 3/1995 Koseki
5,420,630 A * 5/1995 Takei ..... 348/223
5,448,306 A * 9/1995 Koyama
5,471,241 A * 11/1995 Hieda ..... 348/256
5,512,948 A * 4/1996 Iwamatsu
6,163,342 A * 12/2000 Suzuki ..... 348/222

* cited by examiner

*Primary Examiner*—Sherrie Hsia
(74) *Attorney, Agent, or Firm*—Blakely, Sokoloff, Taylor & Zafman LLP

(57) ABSTRACT

A system for generating a digital output signal representing a captured image includes a sensor for capturing the image and generating a sensor output signal. A gain control amplifier is coupled to the sensor and receives the sensor output signal. The gain control amplifier has controls for applying various levels of gain to the sensor output signal. An analog-to-digital converter is coupled to the gain control amplifier and generates the digital output signal representing the captured image. A processor is coupled to the analog-to-digital converter and the gate control amplifier. The processor provides a control signal to the gain control amplifier for adjusting the level of gain applied by the amplifier.

42 Claims, 8 Drawing Sheets

FIG. 1 (Prior Art)
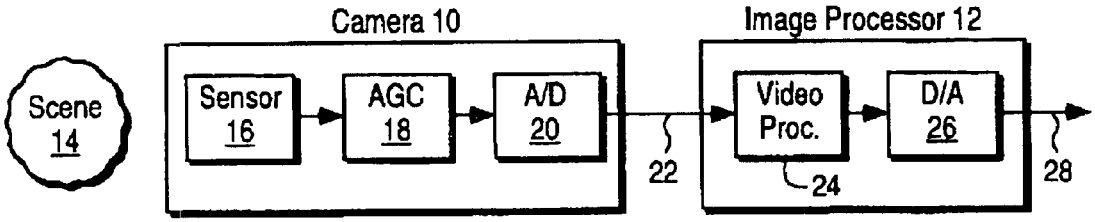
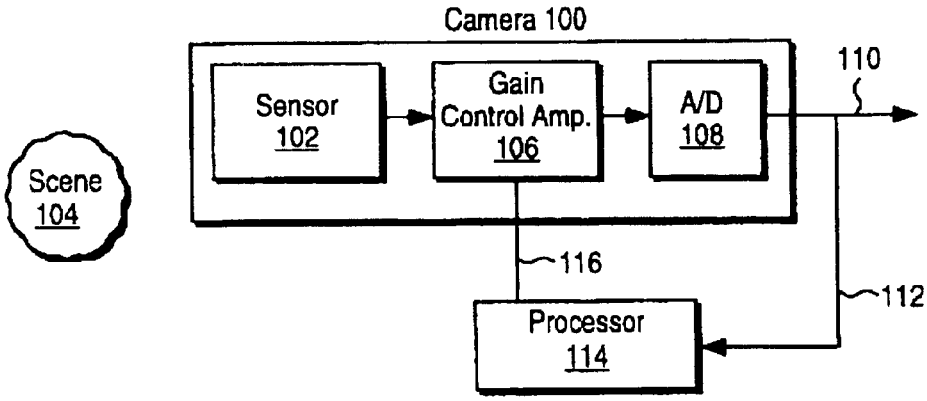
FIG. 2

| | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 6B

| | 1 | 2 | 3 | 4 | 5 | 6 | 7 | 8 |
|---|---|---|---|---|---|---|---|---|
| 1 | 5 | 3 | 2 | 1 | -1 | -1 | -1 | 1 |
| 2 | 5 | 3 | 2 | 1 | -3 | -5 | -5 | 1 |
| 3 | 3 | 2 | 1 | 1 | -3 | -3 | -4 | 1 |
| 4 | 3 | 2 | 0 | 1 | -1 | -1 | -1 | 1 |
| 5 | 2 | 1 | 0 | 0 | 0 | 0 | 0 | 0 |
| 6 | 1 | 1 | 0 | 0 | 0 | 0 | 0 | 0 |
| 7 | 1 | 1 | 0 | 0 | 0 | 0 | 0 | 0 |
| 8 | 1 | 1 | 0 | 0 | 0 | 0 | 0 | 0 |

148

FIG. 6C

| | 1 | 2 | 3 | 4 | 5 | 6 | 7 | 8 |
|---|---|---|---|---|---|---|---|---|
| 1 | 6 | 4 | 2 | 1 | -1 | -1 | -1 | 1 |
| 2 | 5 | 4 | 2 | 1 | -3 | -6 | -6 | 1 |
| 3 | 4 | 3 | 1 | 1 | -3 | -4 | -5 | 1 |
| 4 | 3 | 2 | 1 | 1 | -1 | -2 | -2 | 1 |
| 5 | 2 | 1 | 0 | 0 | 0 | 0 | 0 | 0 |
| 6 | 1 | 1 | 0 | 0 | 0 | 0 | 0 | 0 |
| 7 | 1 | 1 | 0 | 0 | 0 | 0 | 0 | 0 |
| 8 | 1 | 1 | 0 | 0 | 0 | 0 | 0 | 0 |

148

CAMERA HAVING ADAPTIVE GAIN CONTROL

Matter enclosed in heavy brackets [ ] appears in the original patent but forms no part of this reissue specification; matter printed in italics indicates the additions made by reissue.

[This is a continuation of application application Ser. No. 08/638/528, filed Apr. 26, 1996, U.S. Pat. No. 5,614,948.] *The present application Ser. No. 09/491,672, is a reissue of U.S. Pat. No. 5,712,682 having Ser. No. 08/770,386, which is a continuation of application Ser. No. 08/638,528, filed Apr. 26, 1996 (U.S. Pat. No. 5,614,948). The present application is also related to pending application No. 10/769,418, which is a continuation of the present application.*

BACKGROUND OF THE INVENTION

1. Field of the Invention

The present invention relates to image processing. More specifically, a system for capturing and processing video images.

2. Background

Digital cameras are used in a variety of applications requiring image capture and image processing. Many applications require cameras which are economical, yet generate a high quality video signal. Typical solid state sensors used in digital cameras have a dynamic range (or light intensity range) of 1000:1 or greater. However, many existing digital cameras utilize an inexpensive 8 bit or 6 bit analog-to-digital (A/D) converter to generate a digital output signal representing the captured image. The use of an 8 bit A/D converter limits the dynamic range of the output signal by providing a maximum of 256 possible luminance levels. Therefore, the dynamic range capabilities of the sensor (1000:1) are compressed to 256:1 by the A/D converter. This reduction in dynamic range results in "clipping" of the image; i.e., loss of image detail in bright areas and dark areas of the image. When clipping occurs, dark areas of the image become black (e.g., luminance level 0) and bright areas of the image become white (e.g., luminance level 255).

Existing cameras attempt to compensate for this dynamic range reduction by using an automatic gain control (AGC) amplifier having different gain settings. The gain setting of the AGC amplifier is determined based on the total luminance entering the camera. Since a single luminance level is determined, the selected gain setting is applied uniformly to the entire image.

An example of an existing camera is illustrated in FIG. 1. A digital camera 10 is attached to an image processor 12. Camera 10 captures an image of scene 14 and generates a digital signal representing the captured image. A solid state sensor 16 in camera 10 captures an image of scene 14. Typical solid state camera sensors are capable of discriminating light intensity over a dynamic range of 1000:1 or greater. Sensor 16 generates a sensor output signal representing the sensed image and provides the signal to an AGC amplifier 18. AGC amplifier 18 applies a particular gain setting to the sensor output signal. A/D converter 20 receives an output signal from AGC amplifier 18. As discussed above, A/D converter 20 may be an 8 bit or 6 bit converter. Using an 8 bit A/D converter 20, the dynamic range of the sensor output signal is compressed to 256:1. Similarly, using a 6 bit A/D converter 20, the dynamic range of the sensor output signal is compressed to 64:1. This dynamic range compression results in a loss of image detail at both ends of the dynamic range; i.e., bright areas and dark areas. As a result, bright areas of the image are compressed into all white regions and dark areas of the image are compressed into all black regions.

AGC amplifier 18 typically has several different gain settings which may be applied to the sensor output signal. The required gain setting for a particular image is selected based on the total light entering camera 10. If the total light level is low, the gain setting is increased. Similarly, if the total light level is high, the gain setting is decreased. The particular gain setting selected is applied uniformly to the entire image.

A/D converter 20 generates a digital video output signal on a signal line 22. As discussed above, the dynamic range of the digital video output signal is limited by the capacity of A/D converter 20.

FIG. 1 also illustrates image processor 12 coupled to camera 10. Image processor 12 is an optional component, and is not required for proper operation of camera 10. The digital video signal output provided on line 22 may be connected directly to a device capable of accepting digital signals. The optional image processor 12 includes a video processing circuit 24 and a analog-to-digital (D/A) converter 26. Video processing circuit 24 receives the digital video signal output from line 22 and performs various processing of the signal. Various types of video processing circuits and video processing functions will be known to those skilled in the art. D/A converter 26 receives a signal from the video processing circuit, converts the signal to an analog value, and generates an analog video signal output on signal line 28. This analog video signal may be transmitted to any device capable of receiving analog video signals.

Problems associated with dynamic range reduction may be solved by utilizing a 10 bit or 12 bit A/D converter to preserve the dynamic range of the sensor output signal. However, 10 bit and 12 bit A/D converters are expensive and substantially increase the cost of the camera. In an application requiring an inexpensive camera, the use of 10 bit or 12 bit AID converters is not practical.

It is therefore desirable to provide a low-Cost digital camera utilizing an inexpensive A/D converter, yet capable of generating a video signal containing image detail in bright areas and dark areas of the image.

SUMMARY OF THE INVENTION

The present invention provides a digital camera having an inexpensive A/D converter and including a processor for enhancing the dynamic range of the camera. The processor instructs a gain control amplifier to reduce the gain in bright areas of the image and increase the gain in dark areas of the image. These changes in gain settings for different portions of the image increase the image detail provided by the camera, thereby improving the overall image quality.

An embodiment of the present invention provides a sensor for capturing an image and generating a sensor output signal. A gain control amplifier is coupled to the sensor and receives the sensor output signal. The gain control amplifier has controls for applying various levels of gain to the sensor output signal. An analog-to-digital converter is coupled to the gain control amplifier and generates a digital output signal representing the captured image. A processor is coupled to the analog-to-digital converter and the gain control amplifier. The processor provides a control signal to the gain control amplifier for adjusting the level of gain applied by the amplifier.

Another feature of the present invention provides a gain map containing gain settings applied to the sensor output signal by the gain control amplifier. The gain map is continually updated by the processor to include changes in the captured image.

Other embodiments of the invention provide a register coupled to the processor and the gain control amplifier. The gain map containing gain settings is stored in the register and the gain control amplifier reads the gain settings from the register.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1 illustrates a known digital camera and an attached image processor.

FIG. 2 is a first embodiment of a camera and processor according to the present invention.

FIG. 5 illustrates an exemplary captured image divided into an array of image regions.

FIGS. 6A–6C illustrate a gain map at different stages of the image processing procedure.

DETAILED DESCRIPTION

Figure 3:
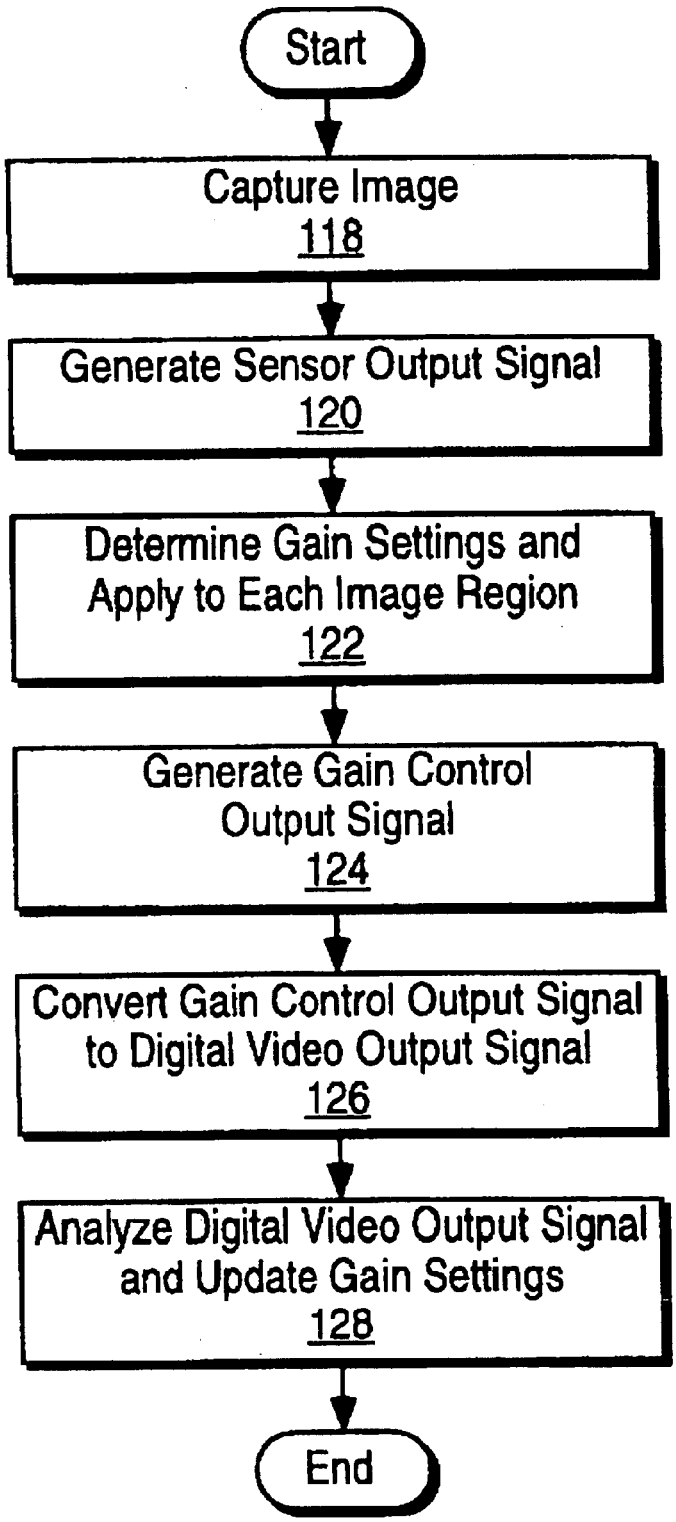
FIG. 3 is a flow diagram illustrating operation of the present invention.

The following detailed description sets forth numerous specific details to provide a thorough understanding of the invention. However, those skilled in the art will appreciate that the invention may be practiced without these specific details. In other instances, well known methods, procedures, components, and circuits have not been described in detail so as not to obscure the invention.

The present invention provides a system for enhancing the dynamic range of a digital camera having an inexpensive A/D converter. An adaptive gain control mechanism is provided for adjusting gain settings applied to a captured image.

A first embodiment of the invention is illustrated in FIG. 2. A digital camera 100 contains a sensor 102 for capturing an image representing a scene 104. Sensor 102 may be any type of sensor capable of generating a signal representing a captured image. In a particular embodiment of the invention, sensor 102 is a solid state sensor having a dynamic range of 1000:1 or greater. Sensor 102 generates a sensor output signal representing the captured image. The sensor output signal is provided to a gain control amplifier 106 having controls for applying various levels of gain to the captured image. In an embodiment of the invention, gain control amplifier 106 is an automatic gain control (AGC) amplifier capable of receiving and adjusting the sensor intensity at each pixel site. An analog output signal from AGC amplifier 106 is provided to the input of an analog-to-digital (A/D) converter 108.

As discussed above, A/D converter 108 may be a relatively inexpensive 6 bit or 8 bit A/D converter. To simplify the explanation of the invention, the specification describes camera 100 and its operation when using an 8 bit A/D converter 108.

A/D converter 108 converts the signal received from gain control amplifier 106 from an analog signal to a digital signal. The digital output of A/D converter 108 is provided on signal line 110 and represents an 8 bit digital video signal of the captured image. As noted above, the dynamic range of the signal on line 110 is limited by the 8 bit capacity of A/D converter 108.

The digital video signal on signal line 110 is also transmitted to a processor 114 using signal line 112. Processor 114 may be any type of processor capable of receiving a digital video signal and performing various operations or calculations related to the received signal. Processor 114 can be a dedicated image processing system or part of a system servicing other devices or performing other functions. In a preferred embodiment of the invention, processor 114 is a personal computer capable of performing a variety of operations and servicing numerous devices. In the preferred embodiment, the personal computer utilizes a Pentium® processor manufactured by Intel Corporation of Santa Clara, Calif.

The actual operations and processing steps performed by processor 114 may be implemented in software executed by processor 114. Those skilled in the art will appreciate that processor 114 may be a single processor device capable of processing digital data (e.g., a digital signal processor) or processor 114 may be a complete computer system containing a variety of devices and capable of performing multiple simultaneous operations. Thus, the invention is capable of being implemented on a wide variety of processing devices and computer platforms.

By way of example, the invention will be described in an implementation utilizing a personal computer as processor 114. Numerous type of computers may be used to practice the invention. The computer must be capable of receiving the digital video signal on signal line 112, performing the necessary operations and calculations, and transmitting a control signal to gain control amplifier 106 using a communication line 116. Line 116 functions as a control bus used to communicate control signals and data between processor 114 and gain control amplifier 106. In a specific embodiment of the invention, line 116 is a high-speed serial bus such as a Universal Serial Bus (USB). Although the invention will be described with reference to a high-speed serial bus, any communication line having sufficient bandwidth and low latency may be used to implement the invention.

In the embodiment of FIG. 2, processor 114 provides real time control of the gain settings applied by gain control amplifier 106. In this situation, the timely transmission of control signals is important to proper camera operation. A significant amount of bandwidth and low latency is required to ensure that gain control amplifier 106 receives the appropriate control signals when needed. Alternate embodiments of the invention may require a smaller portion of the bandwidth and may tolerate greater latency. These alternate bandwidth and latency requirements will be discussed with respect to the particular embodiments described below.

FIG. 3 is a flow diagram illustrating the operation of the system shown in FIG. 2. At step 118 an image is captured by sensor 102 in camera 100. At step 120, sensor 102 generates a sensor output signal which is provided to gain control amplifier 106. At step 122, gain control amplifier 106 determines appropriate gain settings for various regions of the captured image and applies the gain to the corresponding region of the image. The gain settings are provided to gain control amplifier 106 by processor 114 using line 116. Additional details regarding the determination of particular gain settings and dividing the captured image into regions are provided below with reference to FIG. 4.

At step 124 of FIG. 3, gain control amplifier 106 generates a gain control output signal and provides the signal to A/D converter 108. At step 126, A/D converter 108 converts the gain control output signal from an analog signal to a digital video output signal. Finally, at step 128, processor 114 analyzes the digital video output signal and updates the gain settings, as needed, for various regions of the captured image. The steps of FIG. 3 are performed repeatedly to capture and analyze a series of images.

Figure 4:
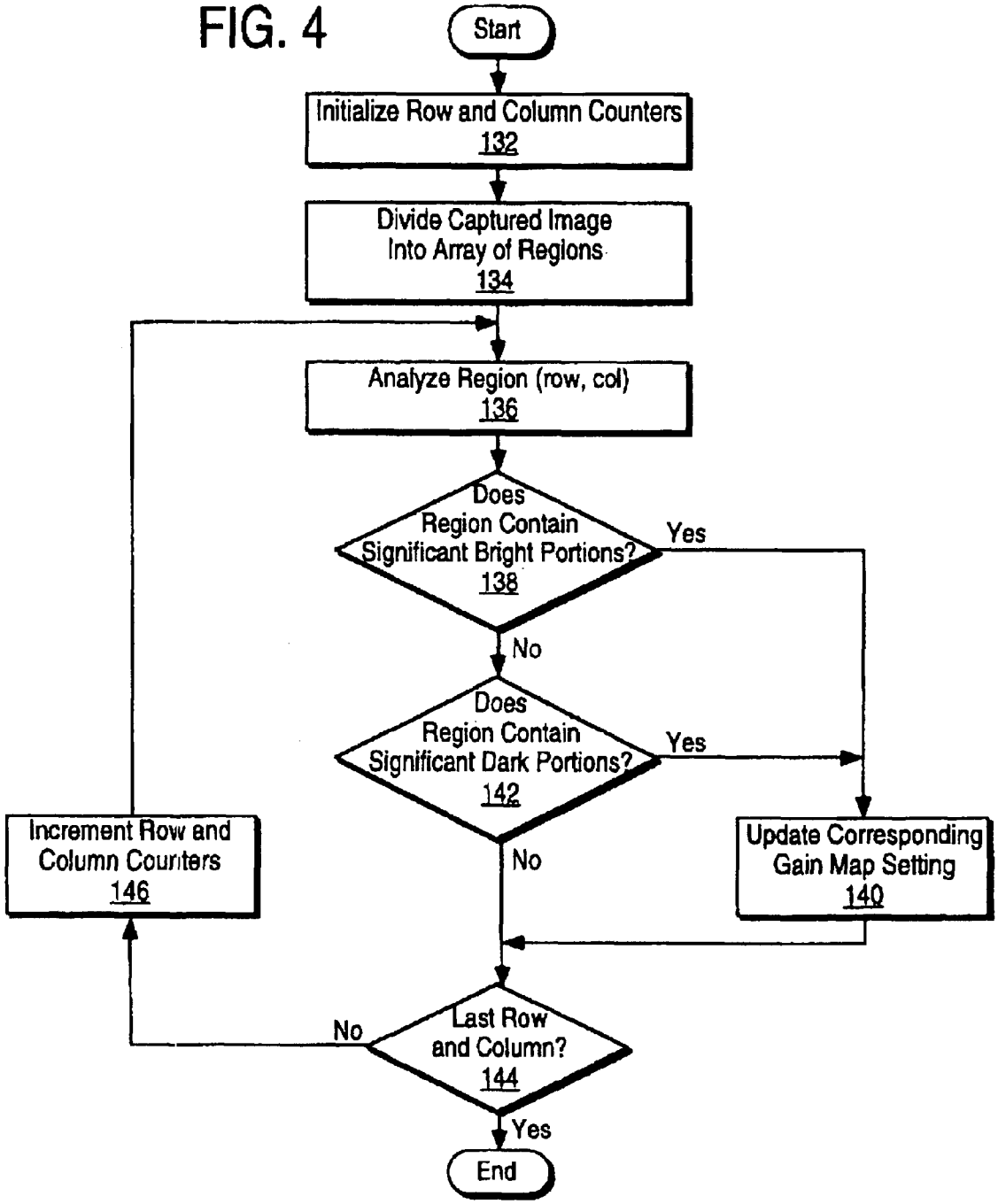
FIG. 4 is a flow diagram showing the analysis of a captured image and the updating of a gain map used by the camera.
Figures 5, 6A:
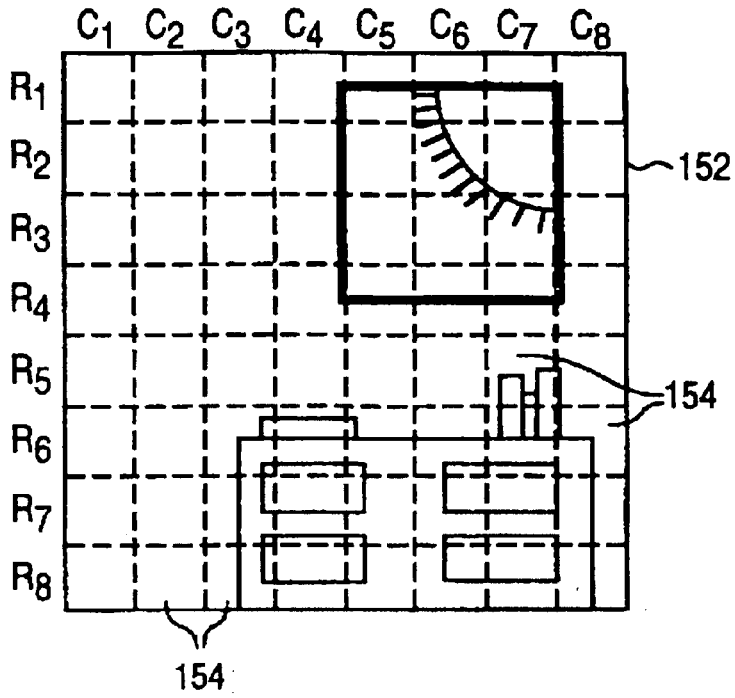

Referring to FIG. 4, a flow diagram illustrates the analysis of a captured image and the updating of a gain map used by camera 100. One example of a gain map 148 is illustrated in FIG. 6A as a two dimensional array of gain settings. The gain settings may be represented in decibels (dB) or any other format capable of indicating the gain to be applied by gain control amplifier 106. Each gain setting indicates a specific gain level to be applied by gain control amplifier 106 to a particular region of the captured image. Gain map 148 includes eight rows and eight columns to create 64 gain map cells 150. FIG. 6A illustrates a default gain map including a zero value stored in each cell 150 of the gain map. These default gain settings are generated when the system is initialized or reset. During operation of camera 100 and associated processor 114, the gain settings in the gain map are updated to enhance the dynamic range of the digital video output signal, thereby increasing the level of detail provided in the digital video signal. In the embodiment of FIG. 2, gain map 148 is stored in a register or other memory device within processor 114.

Referring again to FIG. 4, the procedure illustrated in the flow diagram are performed by processor 114 (shown in FIG. 2). Step 132 initializes a row counter and a column counter used to indicate a particular image region and a particular cell of gain map 148 being analyzed or updated. At step 134, the captured image is divided into an array of image regions. FIG. 5 illustrates an example of a captured image 152 divided into a two dimensional array of image regions 154. For purposes of explanation. FIG. 5 illustrates the actual scene and does not show areas of dipping caused by the A/D converter.

Image 152 is divided into eight rows and eight columns, creating 64 image regions 154. Each image region 154 is associated with a particular gain setting contained in a corresponding cell of gain map 148 (FIG. 6A). Image region (2, 4) is a notation indicating the image region at the intersection of row 2 and column 4. The gain level applied to image region (2, 4) is stored in the gain map at cell (2, 4). Thus, each gain map cell provides a gain level to be applied to the corresponding image region. Although FIGS. 5 and 6A illustrate two dimensional arrays having eight rows and eight columns, any number of rows and columns may be used. As the number of rows and columns is increased, the size of each image region decreases, resulting in more precise gain adjustments to the captured image. However, additional processing resources are required to analyze the captured image as the number of rows and columns are increased.

At step 136 of FIG. 4, the image region indicated by the row and column counters is analyzed by processor 114. Initially, the row and column counters are set to identify image region (1, 1). The counters are incremented for each subsequent cycle of the procedure until all image regions have been analyzed. Processor 114 determines the light level in various portions of the image region being analyzed. At step 138, the routine determines whether the image region contains significant bright portions; i.e., whether image detail has been lost or "clipped" due to the 8 bit limitations of the A/D converter. If the image detail has been clipped at step 138, then the gain map setting for the image region being analyzed is updated at step 140. Gain settings are updated gradually (e.g., 1 db–5 dB) until sufficient image detail is provided in each region of the captured image. Gain settings are continually updated to compensate for changes in the captured image, such as changes in light levels and changes in objects appearing in the captured image.

If image detail has been clipped from the image region at step 138 due to brightness, then the gain map setting for that region is reduced at step 140 to provide increased image detail; i.e., instead of producing all white regions, the gain setting is reduced to prevent clipping and provide enhanced image detail.

If significant bright portions are not identified at step 138, then step 142 determines whether the image region being analyzed contains significant dark portions; i.e., whether image detail has been lost or clipped by the 8 bit A/D converter. If image detail has been lost at step 142, then the gain map setting for that region is increased at step 140 to provide increased image detail. By increasing the gain setting, previously all black portions of the region may begin to show some image detail, thereby increasing the overall image quality.

If the image region being analyzed does not contain significant bright portions or significant dark portions, then-the routine continues to step 144 without updating the gain map setting for the particular image region. Step 144 determines whether the current row and column counters indicate the last row and column of the captured image. If all image regions have been analyzed, then the routine ends. Otherwise, the routine branches to step 146 where the row and/or column counters are incremented to select the next image region of the captured image. The routine then returns to step 136 to analyze the next image region. The image regions may be analyzed in any order. Row and column counters represent an example of a mechanism for analyzing each image region in a systematic manner.

When all regions of a captured image have been analyzed according to the procedure illustrated in FIG. 4, the updated gain map settings are applied to the next captured image by gain control amplifier 106 (FIG. 2). The digital video signal generated using the new gain settings is then analyzed by processor 114 using the procedure shown in FIG. 4 to further update the gain map settings. Thus, the gain map settings are continually updated to maximize the image detail produced in the digital video signal generated by camera 100.

A particular example of the operations performed in FIG. 4 will be described with respect to the captured image shown in FIG. 5 and the gain maps illustrated in FIGS. 6A–6C. FIG. 6A illustrates a default gain map indicating the gain level applied to each region of the first captured image. When camera 100 captures the first image, processor 114 has no previous image data from which to generate gain settings. Therefore, processor 114 supplies a default gain map to camera 100 for the first captured image.

After capturing the first image, processor 114 divides the image into an array of image regions 154, as shown in FIG. 5. Each region 154 is analyzed by processor 114 to determine whether the gain setting for the region should be adjusted to provide increased image detail. Using FIG. 5 as the first captured image, certain regions of the image are bright (in the area of the window and the sun), certain regions are dark (in the corner of the room to the left of the window), and other regions have an average light level (near the desk below the window). Processor 114 decreases the gain setting associated with bright regions and increases the gain setting associated with dark regions.

FIG. 6B illustrates an updated version of gain map 148 after processor 114 has analyzed the first capture image and adjusted the gain settings accordingly. The gain settings illustrated in FIG. 6B are then provided to gain control amplifier 106 for adjusting the gain of the next captured image. As shown in FIG. 6B, the gain settings have been increased along the left side of the image (especially in the upper left portion) in an attempt to reduce clipping in that area and enhance image details. Gain settings in the bright area of the window in the upper right portion of the image have been reduced to enhance image details. Gain settings around the desk (below the window) are unchanged because a sufficient level of detail is already present. As discussed above, gain settings are adjusted in small increments (e.g., 1 dB–5 dB) until sufficient image detail is provided in the particular region. This provides a gradual change in the image detail, rather than sharp or significant changes between captured images.

The gain settings illustrated in FIG. 6B are applied by camera 100 to the second captured image. For this example, the second captured image is the same as FIG. 5; i.e., the scene being captured has not changed since the first image was captured. Since gain setting adjustments are performed gradually, the second captured image requires additional gain setting adjustments to further enhance image details. The digital video output generated by applying the gain settings of FIG. 6B to the second captured image is provided to processor 114 for analysis. As described with respect to the first analysis, the second captured image is divided into an array of image regions 154. Each image region 154 is analyzed and the associated gain setting updated to enhance the image details in the region. The results of the second analysis are illustrated in FIG. 6C. Certain gain settings in the upper left portion of the gain map have been increased to provide additional image details in the dark areas. Gain settings in the bright window area have been further reduced to enhance image details. The updated gain settings illustrated in FIG. 6C will be used by camera 100 to adjust the gain of the next captured image.

The process of capturing an image, applying settings contained in a gain map to the image, and analyzing the digital video output signal to update gain settings is performed repeatedly by the system illustrated in FIG. 2. The gain settings contained in the gain map are updated in response to changes in the captured image; e.g., changes in light level, movement of objects in the image, and the like. Thus, the processor is repeatedly updating the gain map settings to enhance the overall image detail provided in the digital video output signal.

Those skilled in the art will appreciate that various methods may be used by processor 114 to analyze light intensity in each image region. An embodiment of the invention applies a histogram equalization algorithm to each image region. The histogram equalization algorithm generates a histogram of pixel luminance values in a particular region. The histogram is used to identify areas of high luminance and low luminance; i.e., areas requiring gain adjustments. Several exemplary histograms are illustrated in FIGS. 7A–7D. FIGS. 7A–7D are provided for illustration purposes and are not drawn to scale or drawn using the same scale.

Figure 7A:
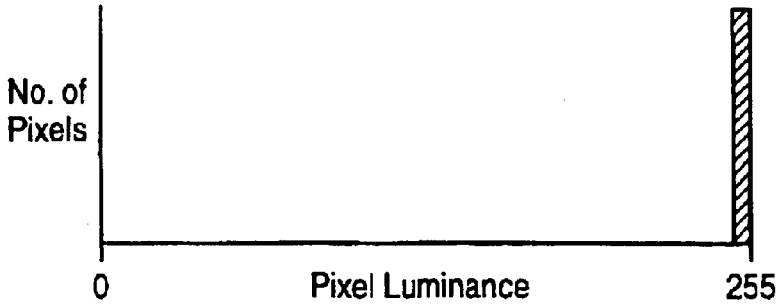
FIGS. 7A–7D illustrate examples of histograms generated for various regions of an image.

FIG. 7A is a histogram for an image region having a high luminance value. The histogram illustrates a large number of pixels having a maximum luminance value of 255 (for an 8 bit A/D converter). This histogram may correspond to an image region of FIG. 5 in the area of the window. In this situation, histogram equalization is performed to generate an increased number of pixels having values less than 255, thereby enhancing image details in the region.

Figure 7B:
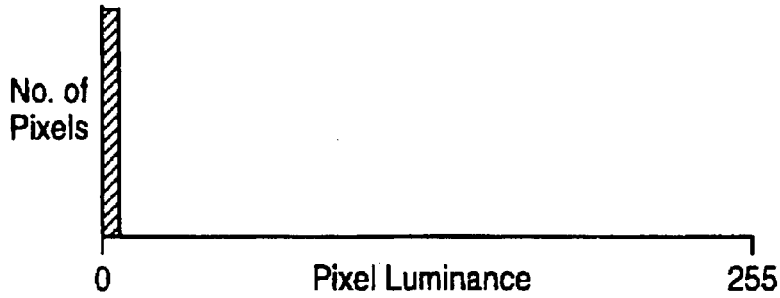

FIG. 7B is a histogram for an image region having a low luminance value, indicated by the large number of pixels having a luminance value of zero (the minimum luminance value). This histogram may correspond to an image region on the left side of FIG. 5. In this situation, histogram equalization is performed to generate an increased number of pixels having values greater than zero to enhance image details in the region.

Figure 7C:
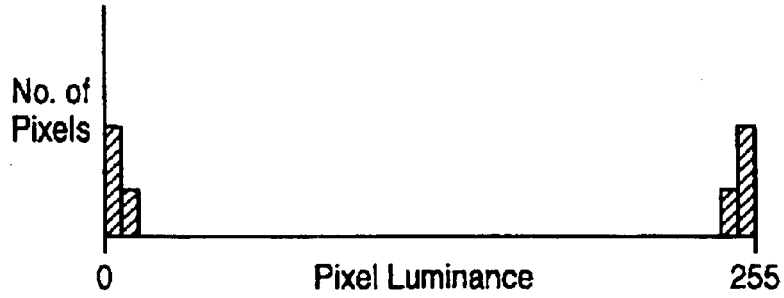

FIG. 7C is a histogram for an image region having both low luminance values and high luminance values, but few intermediate values. The histogram in FIG. 7C identifies a transition region; i.e., a transition between a bright area and a dark area. These regions may receive little or no gain adjustment because both extremes of brightness and darkness are represented in the same image region. If the gain is increased, additional pixels may be increased to a value of 255 resulting in additional loss of detail in the bright areas. Similarly, if the gain is reduced, additional pixels may be decreased to a value of zero resulting in additional loss of detail in the dark areas.

Figure 7D:
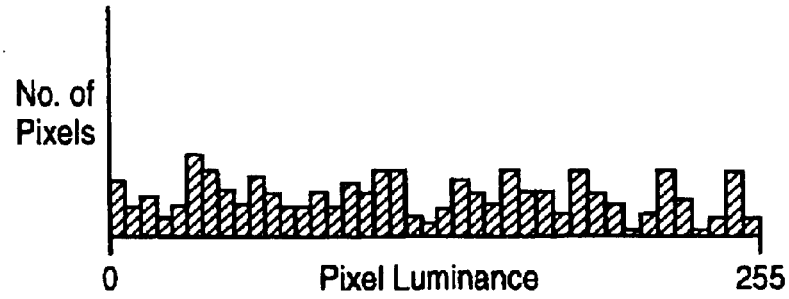

FIG. 7D is a histogram for an image region having a relatively uniform distribution of pixel luminance values throughout the region. This histogram may correspond to an image region under the window in FIG. 5. In this situation, the histogram is already substantially equalized, and no gain adjustments are necessary.

In addition to the histogram equalization algorithm discussed above, various methods and algorithms for smoothing sharp edges and transitions between adjacent image regions will be known to those skilled in the art. These methods and algorithms may be utilized with the present invention to provide smoothing in transition areas and between adjacent image regions.

Figure 8:
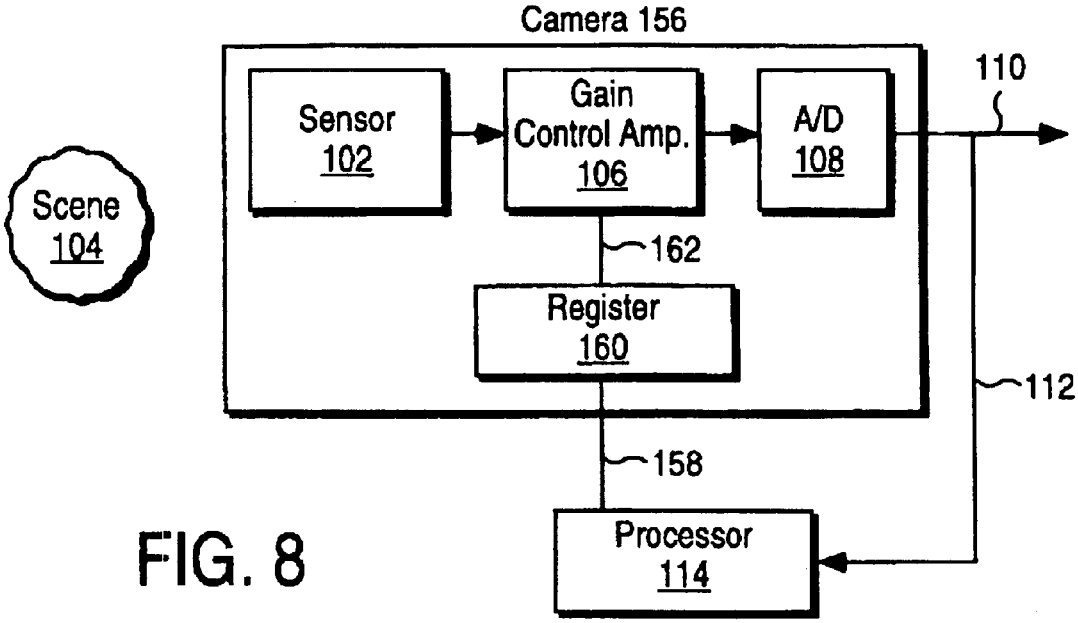
FIG. 8 is a second embodiment of the invention including a register within the camera.
Figure 9:
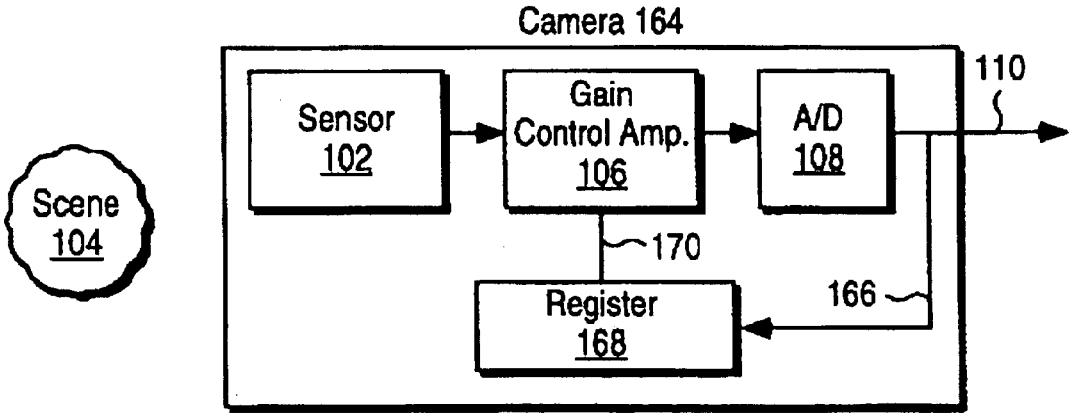
FIG. 9 is a third embodiment of the invention having a processor contained within the camera.
Figure 10:
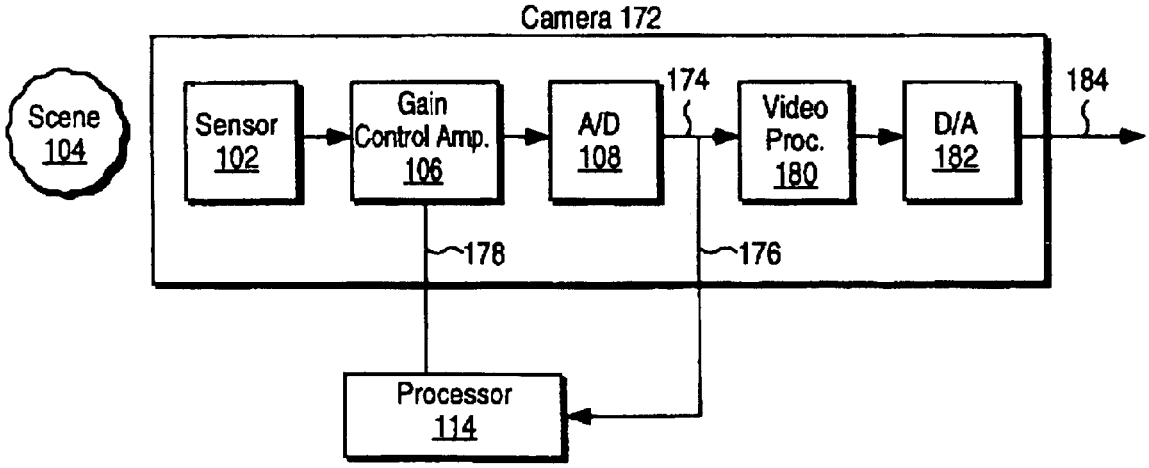
FIG. 10 is a fourth embodiment of the invention including additional processing circuitry within the camera.

As noted above, FIG. 2 illustrates a first embodiment of the invention including camera 100 and processor 114 coupled to the camera. FIGS. 8–10 illustrate alternate embodiments of the invention. The operation of these alternate embodiments is similar to the operation described above with reference to FIGS. 3 and 4.

Referring to FIG. 8, a second embodiment of the invention is illustrated. A camera 156 includes sensor 102, gain control amplifier 106, and A/D converter 108 as described above with respect to FIG. 2. Camera 156 generates a digital video signal on line 110 which is coupled to processor 114 using signal line 111. Processor 114 receives the digital video signal, divides the signal into a plurality of image regions, and analyzes each region as described above with respect to FIGS. 4, 5, and 6A–6C. Camera 156 also includes a register 160 coupled to processor 114 using a communication line 158. Register 160 is also coupled to gain control amplifier 106 using signal line 162. Register 160 is capable of receiving and storing a gain map from processor 114 and providing the gain map settings to gain control amplifier 106 as necessary. Register 160 may be a relatively small register, capable of storing a single copy of the gain map. Gain setting updates and control signals generated by processor 114 are communicated to register 160 using line 158. Register 160 stores the updated gain settings for use by gain control amplifier 106.

The addition of register 160 to camera 156 increases the cost of the camera slightly, but eliminates the dependence of gain control amplifier 106 on communication line 116 (FIG. 2) to receive gain settings contained in the gain map. If communication line 158 in FIG. 8 is shared by other devices and becomes congested, gain setting updates may not be communicated to register 160 in a timely manner. In this situation, gain control amplifier 106 uses the current gain settings contained in register 160 to adjust the gain of a recently captured image. Therefore, this embodiment of the invention may be used with a communication line 158 having a smaller available bandwidth and greater latency because the processor is not providing gain settings to the gain control amplifier in real time. Instead, the gain settings are stored in register 160 and are always available to the gain control amplifier, even if communication line 158 is congested.

Referring to FIG. 9, a third embodiment of the invention is illustrated. A camera 164 includes sensor 102, gain control amplifier 106, and A/D converter 108 as described above with respect to FIG. 2. A digital video signal is provided on a signal line 166 to a processor 168 located within camera 164. Processor 168 is coupled to gain control amplifier 106 using line 170. The operation of the camera shown in FIG. 9 is similar to the operation of the system in FIG. 2. Camera 164 is different from camera 100 (FIG. 2) in that processor 168 is contained within the camera rather than positioned external to the camera. In this situation, processor 168 is used exclusively by the camera. Therefore, processor 168 only requires processing capacity to support the operations of the camera. Although the addition of processor 168 within camera 164 increases the overall cost of the camera, connections associated with an external processor (as shown in FIG. 2) are eliminated.

Referring to FIG. 10, a fourth embodiment of the invention is shown. A camera 172 includes sensor 102, gain control amplifier 106, and A/D converter 108 as described above with respect to FIG. 2. Additionally, camera 172 includes a video processing circuit 180 coupled to A/D converter 108 via signal line 174. A digital-to-analog (D/A) converter 182 is coupled to circuit 180 and generates an analog video output signal on output line 184. Processor 114 is coupled to A/D converter 108 using line 176 and coupled to gain control amplifier 106 using communication line 178. The operation of the camera shown in FIG. 10 is similar to the operation of the system in FIG. 2. Camera 172 differs from camera 100 (FIG. 2) by including circuit 180 and D/A converter 182 within the camera such that the camera produces an analog video output signal. Video processing circuit 180 may be capable of performing a variety of different video processing functions, as will be known to those skilled in the art.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A camera comprising:

a sensor configured to capture an image and generate a sensor output signal representing the captured image;

an amplifier coupled to receive the sensor output signal, wherein the amplifier is configured to apply multiple gain levels to the sensor output signal; and a processor coupled to the amplifier, wherein the processor is configured to provide a control signal to the amplifier to adjust the gain levels applied by the amplifier, *the processor adapted to adjust the gain level of one portion of the captured image in response to a value of a previous portion of the captured image*.

2. The camera of claim 1 wherein the amplifier applies different gain levels to different regions of the captured image.

3. The camera of claim 1 wherein the processor generates a gain map containing gain settings applied to the sensor output signal by the amplifier.

4. The camera of claim 3 wherein the gain map is continually updated by the processor to include changes in the captured image.

5. The camera of claim 3 wherein the gain map is a two dimensional array of gain settings, each gain setting indicating a particular gain applied by the amplifier to a corresponding region of the captured image.

6. The camera of claim 3 further including a register coupled to the processor and the amplifier.

7. The camera of claim 6 wherein the gain map is stored in the register and the amplifier reads the gain settings from the register.

8. The camera of claim 1 wherein the processor provides the control signal to the amplifier in real-time.

9. The camera of claim 1 wherein the processor analyzes the sensor output signal to determine whether a sufficient level of detail is provided in the sensor output signal.

10. The camera of claim 9 wherein the processor increases the gain levels in dark portions of the captured image and the processor decreases the gain levels in bright portions of the captured image.

11. An apparatus for capturing an image, comprising a camera, including:

a sensor configured to capture the image and generate a sensor output signal representing the captured image;

an amplifier coupled to receive the sensor output signal, wherein the amplifier has controls to apply multiple gain levels to the sensor output signal; and a processor coupled to the camera, wherein the processor is configured to receive the sensor output signal, and wherein the processor is configured to provide a control signal to the amplifier to adjust the gain level applied by the amplifier *so that the gain level of one portion of the captured image is different than the gain level of another portion of the captured image, and wherein the processor generates a gain map containing gain settings applied to the sensor output signal by the amplifier*.

[12. The apparatus of claim 11 wherein the processor generates a gain map containing gain settings applied to the sensor output signal by the amplifier.]

13. The apparatus of claim [12] *11* wherein the gain map is a two dimensional array of gain settings, each gain setting indicating a particular gain applied by the amplifier to a region of the captured image.

14. The apparatus of claim 13 wherein the processor divides the captured image into a two dimensional array of image regions, each image region associated with a corresponding gain setting in the gain map.

15. The apparatus of claim [12] *11* wherein the camera further includes a register coupled to the processor and the amplifier.

16. The apparatus of claim 15 wherein the gain map is stored in the register and the amplifier reads the gain settings from the register.

17. A method for enhancing the dynamic range of a sensor output signal representing a captured image, the method comprising the steps of:

amplifying the sensor output signal in response to gain settings contained in a gain map, wherein each gain setting is associated with a particular region of the captured image; and updating the gain settings contained in the gain map in response to changes in the sensor output signal.

18. The method of claim 17 wherein the step of updating the gain settings is performed in response to clipping of the amplified sensor output signal.

19. The method of claim 17 wherein the step of updating the gain settings includes increasing the gain settings in dark portions of the image and reducing the gain settings in bright portions of the image.

20. The method of claim 17 wherein the step of updating the gain settings includes dividing the captured image into a plurality of image regions, wherein each image region is associated with a particular gain setting in the gain map.

21. The method of claim 17 further including the step of analyzing each image region and updating the associated gain setting in response to clipping of the amplified sensor output signal in the image region.

22. An apparatus for capturing an image and generating a signal representing the captured image, comprising:

means for amplifying the signal in response to gain settings contained in a gain map, wherein each gain setting is associated with a particular region of the captured image;

means for updating the gain settings contained in the gain map; and means for generating a control signal indicating a particular gain setting to be applied to a portion of the signal representing the captured image.

*23. An apparatus adapted to process an image, comprising:*

*an amplifier adapted to apply more than one gain level to the image; and*

*a processor coupled to the amplifier, wherein the processor is capable of adjusting the more than one gain level applied by the amplifier in real time, and wherein the processor is capable of updating a gain map comprising settings applied by the amplifier.*

*24. The apparatus of claim 23, further comprising a sensor coupled to the amplifier provide the amplifier with the image.*

*25. The apparatus of claim 23, wherein the processor is further capable of providing a control signal to the amplifier to adjust the more than one gain level applied by the amplifier.*

*26. The apparatus of claim 23, wherein the amplifier is capable of applying different gain levels to different regions of the image.*

*27. The apparatus of claim 23, wherein the gain map is a two dimensional array of gain levels, each gain level indicating a particular gain applied by the amplifier to a corresponding region of the image.*

*28. The apparatus of claim 23, further comprising a register coupled to the processor and the amplifier.*

*29. The apparatus of claim 28, wherein the register is capable of storing the gain map and the amplifier is adapted to read the gain levels from the register.*

*30. The apparatus of claim 25, wherein the processor is further adapted to provide the control signal to the amplifier in real-time.*

*31. The apparatus of claim 24, wherein the processor is further adapted to analyze the image to determine if the sensor is providing a sufficient level of detail.*

*32. The apparatus of claim 31, wherein the processor is further adapted to increase the gain level in dark portions of the image and decrease the gain level is bright portions of the image.*

*33. An apparatus capable of processing an image, comprising:*

*an image capture device coupled to the apparatus and capable of providing the image;*

*an amplifier coupled to the image capture device, wherein the amplifier is adapted to apply at least two gain levels, each to a different region of the image; and*

*a processor coupled to the amplifier, wherein the processor is adapted to provide a signal to the amplifier to adjust the at least two gain levels and apply one gain level to a first portion of the image and a second gain level to a second portion of the image, and wherein the processor is capable of generating a gain map containing gain levels applied by the amplifier.*

*34. The apparatus of claim 33, wherein the image capture device is a camera.*

*35. The apparatus of claim 33, wherein the gain map is a two dimensional array of gain levels, each gain level indicating a particular gain applied by the amplifier to a region of the image.*

*36. The apparatus of claim 35, wherein the processor is capable of dividing the image into a two dimensional array of image regions, each image region being associated with a corresponding level in the gain map.*

*37. The apparatus of claim 33, further comprising a register coupled to the processor.*

*38. The apparatus of claim 37, wherein the register is capable of storing a gain map and the amplifier is capable of reading the gain levels from the register.*

*39. A method of processing an image, comprising:*

*amplifying a first portion of the image to a first gain level;*

*amplifying a second portion of the image to a second gain level; and*

*updating the first gain level and the second gain level in a gain map.*

*40. The method of claim 39, wherein updating the first gain level and the second gain level is performed in response to clipping of a portion of the image.*

*41. The method of claim 39, wherein updating the first gain level and second gain level includes increasing the gain level in dark portions of the image and reducing the gain level in bright portions of the image.*

*42. The method of claim 39, wherein updating the first gain level and the second gain level includes dividing the image into a plurality of image regions, wherein each of the plurality of image regions is associated with a gain level in the gain map.*

*43. The method of claim 39, further comprising analyzing each image region and updating the associated gain level in response to clipping of the image.*

* * * * *